United States Patent [19]
Maxwell

[11] 3,759,162
[45] Sept. 18, 1973

[54] COFFEE MAKER FOR REPETITIVELY BREWING SINGLE CUPS OF FRESH COFFEE

[76] Inventor: Keaton Bruce Maxwell, 3030 N. 7th St., No. 108, Phoenix, Ariz. 85014

[22] Filed: Aug. 2, 1971

[21] Appl. No.: 168,432

Related U.S. Application Data

[63] Continuation-in-part of Ser. No. 862,894, Oct. 1, 1969, abandoned.

[52] U.S. Cl. .................................................. 99/289
[51] Int. Cl. ........................................... A47j 31/40
[58] Field of Search ..................... 99/283, 289, 282, 99/302; 222/335

[56] References Cited
UNITED STATES PATENTS

| | | | |
|---|---|---|---|
| 2,935,011 | 5/1960 | Perlman | 99/283 |
| 2,993,430 | 7/1961 | Maxwell | 99/289 |
| 3,089,404 | 5/1963 | Parraga | 99/289 |
| 3,499,506 | 3/1970 | Durnan et al. | 222/335 X |

FOREIGN PATENTS OR APPLICATIONS

| | | | |
|---|---|---|---|
| 593,616 | 5/1959 | Italy | 99/289 |

Primary Examiner—John Petrakes
Assistant Examiner—Philip R. Coe
Attorney—James H. Phillips et al.

[57] ABSTRACT

Apparatus is provided for brewing coffee a single cup at a time. A longitudinally traversing piston within a cylinder is provided with a transverse bore which registers, successively, with a hopper which fills the bore with coffee grounds, with opposed hot water receiving and dispensing ports, and with fresh water receiving and flushing ports. The hot water utilized in brewing the coffee is received from a hot water chamber which contains a predetermined measure of water and also compression spring means for forcing the water through the grounds at a controlled rate by acting upon a piston which functions as a deflectable wall of the hot water chamber. The hot water chamber is refilled after use and the dispensing piston reset by water under the line pressure which is sufficient to compress the spring to a predetermined position.

4 Claims, 4 Drawing Figures

INVENTOR
KEATON BRUCE MAXWELL
BY
Drummond, Cahill & Phillips
ATTORNEYS

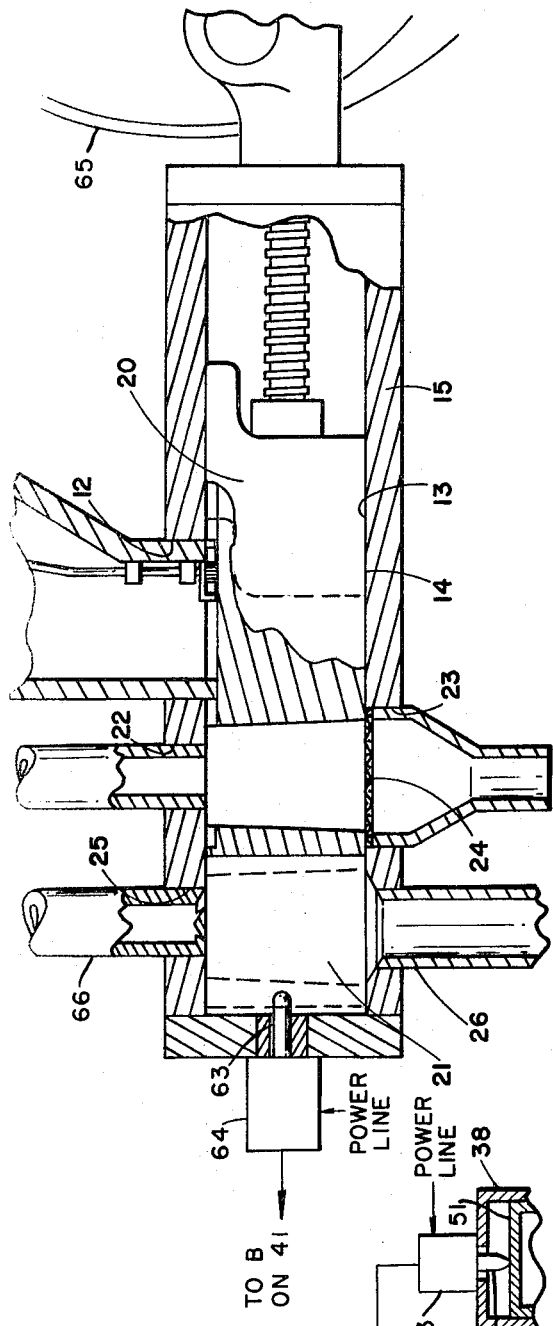
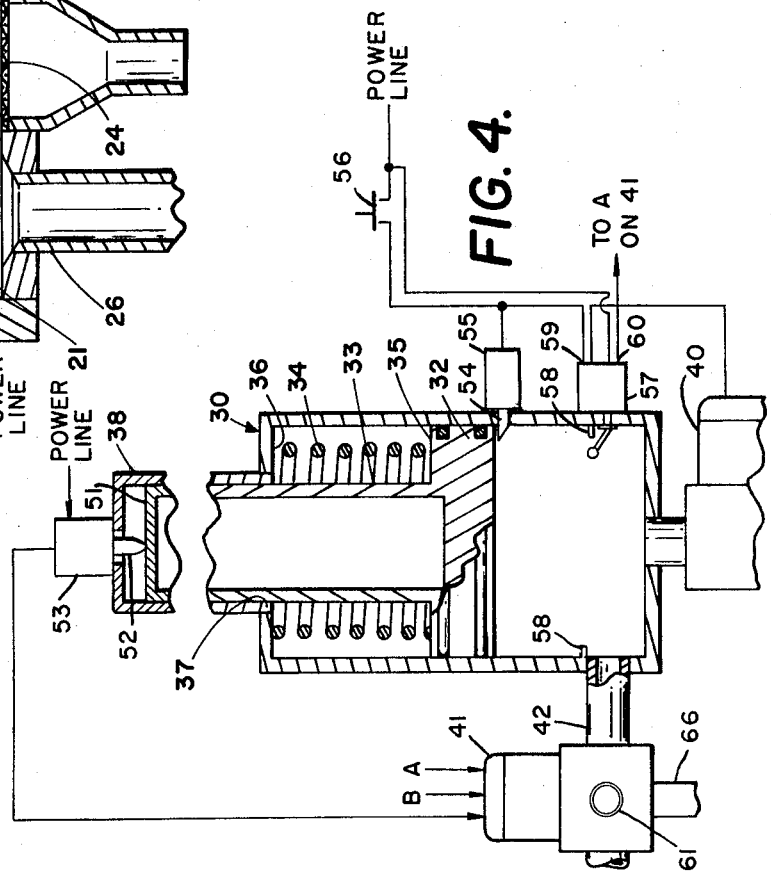

COFFEE MAKER FOR REPETITIVELY BREWING SINGLE CUPS OF FRESH COFFEE

This is a Continuation-In-Part of my copending application, now abandoned, Ser. No. 862,894, filed Oct. 1, 1969, entitled "Coffee Maker."

My invention relates to automatic coffee makers and, more specifically, to apparatus for brewing and dispensing measured amounts of coffee, one measure at a time.

In another aspect, my invention relates to certain improvements in an apparatus of the type described.

I have improved the construction and operation of the coffee brewer which was the subject of my U.S. Pat. No. 2,993,430, issued July 25, 1961. This type of coffee maker is designed principally for use in offices, stores, factories and other commercial and professional type establishments where they are a matter of convenience for both employer and employee. Freshly brewed coffee has an almost universal appeal. The taste and aroma of a freshly brewed cup of coffee has never been satisfactorily duplicated by substitute alternatives such as instant and freeze dried coffees. The employer, in an attempt to minimize the loss of productive time occasioned by the "coffee break," has sought to bring the coffee to the employee thereby saving the time consumed by employees in going to a place outside the work area for the purchase and consumption of coffee. Indeed, employers have found it to be good business to furnish the coffee to the employees at no charge at the site of employment. In fact, an industry has sprung up in response to this need and there are companies which rent coffee brewing and dispensing machines to employers for use by employees. Both employers who own brewing and dispensing machines and businesses which supply such machines to employers on a rental basis are constantly searching for more efficient machines which are easier to maintain and operate.

Accordingly, it is an object of this invention to provide an improvement to an existing type of coffee brewing and dispensing machine.

It is a further object of this invention to provide such a machine which has fewer moving parts.

Yet another object of this invention is to provide such a machine which requires less material and fewer steps in the manufacture thereof.

Other, further, and more specific objects and advantages of the invention disclosed will become apparent to those skilled in the art from the following description of the invention taken in conjunction with the drawings in which:

FIG. 3 is a view of the brewing apparatus wherein a hollow cylinder is partly in section as are also the ports in the walls thereof; and FIG. 4 is a view of the water measuring and dispensing apparatus, in section, to illustrate the internal construction thereof.

Briefly, I provide in my invention an elongate hollow cylinder having a dry coffee intake port, a hot-water-inlet port, and a fresh-water-intake port longitudinally spaced along the cylinder and first and second outlet ports respectively opposed to said hot water and fresh-water-intake ports. A filter screen is placed in the wall of said cylinder across the first outlet port. Within the cylinder, I provide a piston slidably and sealingly disposed for reciprocating action. This piston has a transverse brewing bore for receiving a measured amount of dry coffee from the coffee intake port. The transverse brewing bore advances to the hot-water-intake port where, at the commencement of a dispensing cycle, it receives hot water under pressure for brewing coffee and discharging it through the first outlet port. When advanced to the fresh-water-intake port, the transverse brewing bore receives flushing water through the port which flushes coffee grounds out of the bore through the second outlet. Finally, I utilize means from the prior art for reciprocating the piston within the cylinder to consecutively register the brewing bore with the coffee intake port, with the hot-water-intake port, and with the fresh-water-intake port.

Figure 1:
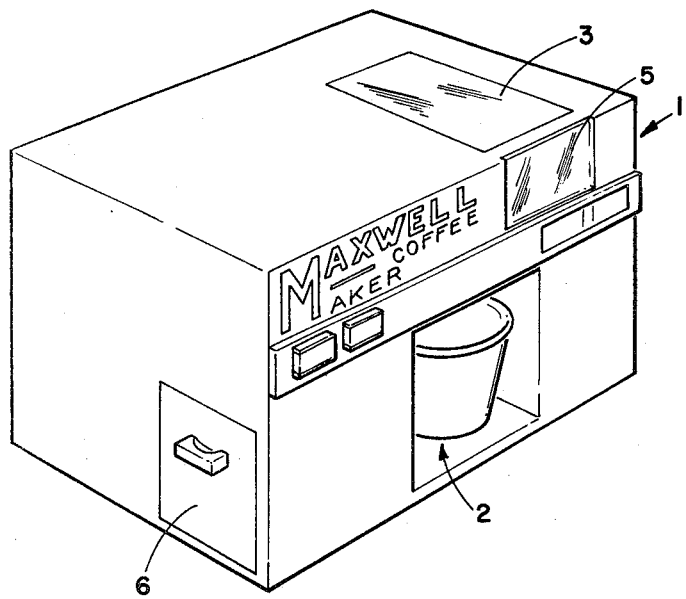
FIG. 1 is a view of the cabinet enclosing the working parts of my invention.

Turning now to the drawings in which the same reference numerals indicate corresponding elements throughout the various views, FIG. 1 shows a coffee cup in position to receive a freshly brewed measure of coffee from my invention. The coffee cup is positioned in an aperture 2 in the cabinet 1. A door 3 is provided at the top of the cabinet giving access to a hopper 4, shown in FIG. 2, containing fresh coffee. The hopper 4 is preferably made of transparent plastic, and a window 5 is provided in the case 1 through which the coffee remaining in the hopper 4 may be observed. At one end of the cabinet 1, I have provided a door 6 giving access to internal working parts of the invention which most often require servicing.

Figure 2:
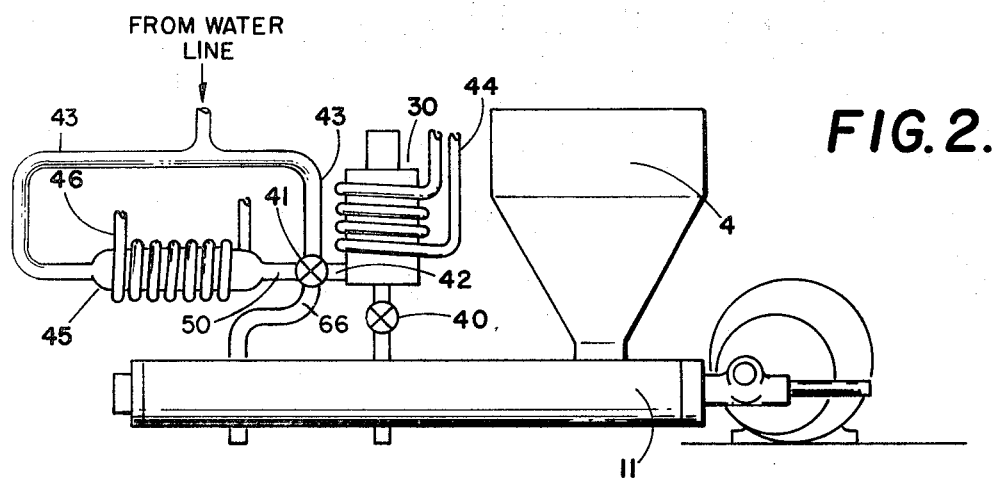
FIG. 2 is a view of certain internal working parts of my invention, including a hopper, brewing apparatus, piston and piston actuating means and water heating elements connected to the brewing apparatus.

In FIG. 2, inside the cabinet 1, I have provided a hopper 4 which contains fresh coffee. The bottom of the hopper 4 communicates with a dry coffee intake port 12 in the wall of the hollow cylinder 11. Referring also to FIG. 3, the interior 13 of the hollow cylinder 11 is bored, and a piston 20 is machined to fit the inside bore 14 of the cylinder 11 in close fitting sliding relationship thereto. The close tolerance dispenses with the necessity for piston rings in the moving parts of my invention. The piston 20 also has a transverse bore 21, and in the rest or initial position, the transverse bore registers with a hot-water-inlet port 22, having received dry coffee from the hopper 4 through a dry coffee intake port 12 just prior to completing a previous dispensing cycle. The transverse bore 21 is sized to receive one measure of dry coffee suitable for brewing a single cup of coffee. Liners may be inserted in the transverse bore 21 to reduce the amount of dry coffee contained and carried by the transverse bore, thereby adjusting the strength of the coffee.

The mode of operation of the reciprocating mechanism 65, which controls the pauses and longitudinal translation of the piston 20, is fully described in my U.S. Pat. No. 2,993,430, issued July 25, 1961. Only the detail required to fully understand the novel aspect of the improvements embodied in this invention are set forth in this disclosure.

FIG. 4 illustrates the manner in which the hot water chamber 30 is filled and emptied and also means for adjusting its capacity. The hot water chamber 30 is fitted with a piston 32 which functions as a deflectable wall partially defining the interior, and hence the capacity of the chamber. The piston 32 has an upwardly extending stem portion 33 of smaller diameter than the piston.

A compression spring 34 is concentrically disposed about the stem and bears upon the upper shoulder 35 of the piston 32 and on the ceiling 36 of the hot water chamber 30, thus biasing the piston 32 downwardly. The stem 33 of the piston 32 protrudes upwardly through an aperture 37 in the ceiling 36 of the chamber 30 into a sleeve 38 which fits into the aperture 37 and encloses the upper portion of the stem 33. Referring again to FIG. 2, it will be observed that water from a line source 43 in introduced under pressure into a preheating chamber 45. In a first position, the double solenoid valve 41 permits communication between the outlet conduit 50 of the preheating chamber 45 and the inlet conduit 42 to the hot water chamber 30. In this position, the pressure of the water from the line raises the piston 32, FIG. 4, until the upper portion 51 of the stem 33 of the piston 32 abutts the plunger 52 of a switch 53 to actuate the solenoid of the solenoid operated valve 41 and cut off the introduction of water into the chamber 30. As the piston 32 is forced upwardly, the upper surface 35 abutts the angled plunger surface 54 of a spring loaded solenoid 55 and forces it radially outwardly. The plunger 52 of the switch 53 is positioned to actuate the switch 53 just after the lower edge of the piston 32 clears the plunger 54 which thereupon springs radially inwardly to hold the piston 32 in the cocked position. It will be observed that the capacity of the hot water chamber 30 can be adjusted by correspondingly adjusting the vertical positions of the plungers 52 and 54.

As the water is held in the hot water chamber 30, the electrical coil 44 quickly brings the water to dispensing temperature if it has not had time to reach that temperature while in the preheating chamber 45. Both the coils 44 and 46 may be controllably energized by conventional thermostat means, not shown, to insure that the water is dispensed at the proper temperature.

A dispensing cycle is initiated by closing the switch 56, which may be manually or coin operated, thereby closing the circuit between the electrical line and the solenoid-operated valve 40 through normally closed contacts 59 of a switch 57. Simultaneously, the solenoid 55 is actuated to retract the plunger 54. As a result, the piston 32 moves downwardly under the influence of the compression spring 34 forcing the hot water through the solenoid operated valve 40 and through the hot-water-inlet port 22 to discharge the water for brewing purposes into the transverse bore 21. The brewed liquid coffee is then discharged through the outlet port 23 into any suitable container for receiving the freshly brewed coffee. As the piston 32 moves downwardly, it abutts inwardly projecting stop members 58 which limit its downward travel. In this lowermost position, the switch 57 is actuated to open the circuit between the solenoid-operated valve 40 and the power line, thereby permitting the valve to close to stop the discharge of water. To prevent the coffee grounds from being discharged with the freshly brewed coffee, a filter screen 24 is recessed in the wall 15 of the cylinder 11 in registration with the first outlet port 23.

Simultaneously with the actuation of normally closed contacts 59 of the switch 57, normally open contacts 60 are closed to provide energization to one of the solenoids on the double valve 41 permitting preheated water to flow from the preheating chamber 45 into the hot water chamber 30 to raise the piston 32 and recock it with a charge of brewing water as previously described. In the meantime, the piston 20 moves to the grounds flushing position under the influence of the reciprocating mechanism 65 at which point, as best shown in FIG. 3, the plunger 63 of a switch 64 is actuated to admit fresh water through an inlet 61 and out an outlet 66 to the intake port 25 thereby flushing the coffee grounds from the registered transverse bore 21 through the second outlet port 26. In order to facilitate discharge of the coffee grounds from the transverse bore 21, as illustrated in the drawings, the bore is tapered outwardly from the inlet to the outlet thereof. Thus, when the piston 20 is moved to its fully extended position, the tapered transverse bore 21 is moved into position with the second outlet port 26 and flushing water entering the second water intake port 25 effectively displaces the coffee grounds from the transverse bore 21, flushing them into the second outlet port 26.

Subsequently, under the influence of the reciprocating mechanism 65, the piston 20 is withdrawn until the longitudinal bore 21 is registered with the dry coffee intake port 12 of the coffee hopper 4 to receive a charge of fresh dry coffee after which the piston 20 advances to a position of registration with the ports 22 and 23 to await the initiation of another dispensing cycle effected described.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A machine for automatically brewing and dispensing one measure of coffee at a time, comprising:

A. an elongate hollow cylinder having a dry coffee intake port, a hot water inlet port, and a fresh water inlet port longitudinally spaced along the cylinder; first and second outlet ports respectively opposed to said hot water and said fresh water inlet ports;

B. a hot water measuring and dispensing chamber having an outlet communicating with said hot water inlet port; said hot water chamber having a resiliently deflectable wall movably responsive to water pressure internally of said hot water chamber; said wall tending to expel hot water outwardly through said outlet of said chamber; said hot water chamber having a water supply replenishing inlet communicating with the interior thereof;

C. first electrical heating means in direct heat-conducting relationship with said hot water chamber to heat the water therein and maintain the temperature of the water therein at a predetermined level;

D. an inlet shutoff control valve in liquid communication with a conventional line source of water under pressure and disposed to selectively admit water to flow from the source into said chamber inlet after a charge of water has been expelled therefrom;

E. an outlet shutoff control valve communicating with said outlet of said hot water chamber and disposed to pass hot water from said chamber outlet into said hot water inlet port;

F. a piston slidably sealingly disposed for reciprocating action within said cylinder, and means for reciprocating said piston within said cylinder to consecutively register said brewing bore with said hot water inlet port, with said water inlet port, and with said coffee intake port;

G. said piston having a transverse brewing bore for serially receiving a measured amount of dry coffee from the said coffee intake port, receiving hot water under pressure from said hot water inlet port for brewing fresh coffee and discharging the same through the first outlet port, and receiving flushing water through said fresh water inlet port for flushing coffee grounds out of said bore through said second outlet.

2. The brewing and dispensing machine of claim 1 in which said deflectable wall comprises a moveable piston within said chamber, said piston being biased toward said outlet of said chamber by compression spring means.

3. The brewing and dispensing machine of claim 2 which further includes means responsive to a predetermined translation distance of said piston from said outlet of said chamber under the influence of water pressure from the source to cut off flow therefrom, and latching means for holding said piston at a predetermined distance from said outlet of said chamber whereby a dispensing cycle may be instituted by unlatching said latching means thus permitting said piston to move toward said outlet of said chamber to push the hot water through the coffee grounds at a pressure and rate determined by said compression spring.

4. The brewing and dispensing means of claim 3 which further includes a water preheating chamber having an inlet connected to the source and an outlet connected to said water supply replenishing inlet of said hot water chamber, and second electrical heating means in direct heat conducting relationship with said preheating chamber to heat the water therein and maintain the temperature of the water therein at a predetermined level.

* * * * *